(12) United States Patent
Dettinger et al.

(10) Patent No.: US 9,247,022 B2
(45) Date of Patent: Jan. 26, 2016

(54) METHOD AND APPARATUS FOR OPTIMIZING PERFORMANCE AND NETWORK TRAFFIC IN DISTRIBUTED WORKFLOW PROCESSING

(71) Applicant: International Business Machines Corporation, Armonk, NY (US)

(72) Inventors: Richard D. Dettinger, Rochester, MN (US); Cale T. Rath, Rochester, MN (US); Richard J. Stevens, Rochester, MN (US); Shannon E. Wenzel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 13/745,958

(22) Filed: Jan. 21, 2013

(65) Prior Publication Data

US 2013/0232230 A1 Sep. 5, 2013

Related U.S. Application Data

(63) Continuation of application No. 10/877,229, filed on Jun. 25, 2004, now Pat. No. 8,423,950.

(51) Int. Cl.
*H04L 29/08* (2006.01)
*G06F 9/50* (2006.01)

(52) U.S. Cl.
CPC .............. *H04L 67/32* (2013.01); *G06F 9/5038* (2013.01); *G06F 9/5055* (2013.01); *G06F 2209/549* (2013.01)

(58) Field of Classification Search
CPC .................................................. G06F 9/5038
See application file for complete search history.

(56) References Cited

U.S. PATENT DOCUMENTS

| | | | |
|---|---|---|---|
| 5,457,797 A * | 10/1995 | Butterworth et al. | 719/320 |
| 5,606,493 A | 2/1997 | Duscher et al. | |
| 5,754,857 A | 5/1998 | Gadol | |
| 5,826,239 A | 10/1998 | Du et al. | |
| 5,960,404 A | 9/1999 | Chaar et al. | |
| 6,009,405 A | 12/1999 | Leymann et al. | |
| 6,067,548 A | 5/2000 | Cheng | |
| 6,157,934 A | 12/2000 | Khan et al. | |
| 6,237,020 B1 * | 5/2001 | Leymann et al. | 709/201 |
| 6,415,297 B1 | 7/2002 | Leymann et al. | |
| 6,507,844 B1 * | 1/2003 | Leymann et al. | 1/1 |
| 6,697,784 B2 * | 2/2004 | Bacon et al. | 705/7.26 |

(Continued)

OTHER PUBLICATIONS

Karsten A. Schultz and Maria E. Orlowska, "Facilitating cross-organisational workflows with a workflow view approach", Mar. 3, 2004, SAPAustralia Ltd., Corporate Research.

(Continued)

*Primary Examiner* — Matthew Brophy
(74) *Attorney, Agent, or Firm* — Patterson & Sheridan, LLP

(57) ABSTRACT

Methods and apparatus to optimize workflow execution by making intelligent decisions regarding service requests to perform workflow processes on one or more servers are provided. For some embodiments, a workflow controller may analyze a workflow definition specifying a set of tasks to be performed in order to determine if multiple tasks may be performed locally, on a common server. If so, the controller may generate a remote service to perform the multiple tasks on the common server, without requiring intermediate transfer of data between a local server on which the controller is running and the common remote server.

14 Claims, 5 Drawing Sheets

(56) References Cited

U.S. PATENT DOCUMENTS

| | | | |
|---|---|---|---|
| 6,725,227 | B1 | 4/2004 | Li |
| 6,785,726 | B1 * | 8/2004 | Freeman et al. ............... 709/227 |
| 6,832,201 | B1 | 12/2004 | Leymann et al. |
| 6,895,573 | B2 | 5/2005 | Nørgaard et al. |
| 7,155,638 | B1 * | 12/2006 | Heideman et al. ............... 714/11 |
| 7,168,077 | B2 | 1/2007 | Kim et al. |
| 7,181,642 | B1 * | 2/2007 | Heideman et al. ............... 714/6.1 |
| 7,222,334 | B2 | 5/2007 | Casati et al. |
| 7,240,324 | B2 | 7/2007 | Casati et al. |
| 7,272,816 | B2 | 9/2007 | Schulz et al. |
| 7,350,188 | B2 | 3/2008 | Schulz |
| 7,360,201 | B2 | 4/2008 | Srivastava |
| 7,805,327 | B1 * | 9/2010 | Schulz et al. ................ 705/7.26 |
| 7,810,099 | B2 | 10/2010 | Dettinger et al. |
| 8,423,950 | B2 | 4/2013 | Dettinger et al. |
| 2002/0062334 | A1 | 5/2002 | Chen et al. |
| 2002/0120484 | A1 * | 8/2002 | Bantz et al. ........................ 705/8 |
| 2002/0120711 | A1 * | 8/2002 | Bantz et al. .................... 709/217 |
| 2002/0184070 | A1 | 12/2002 | Chen et al. |
| 2002/0194257 | A1 * | 12/2002 | Casati et al. ................... 709/201 |
| 2003/0079200 | A1 | 4/2003 | Leymann et al. |
| 2003/0135384 | A1 | 7/2003 | Nguyen |
| 2003/0154121 | A1 | 8/2003 | Konnersman |
| 2003/0236693 | A1 | 12/2003 | Chen et al. |
| 2004/0054743 | A1 * | 3/2004 | McPartlan et al. ............. 709/206 |
| 2004/0078258 | A1 | 4/2004 | Schulz et al. |
| 2004/0078778 | A1 * | 4/2004 | Leymann et al. .............. 717/105 |
| 2004/0083448 | A1 | 4/2004 | Schulz et al. |
| 2004/0117358 | A1 | 6/2004 | von Kaenel et al. |
| 2004/0187089 | A1 | 9/2004 | Schulz |
| 2005/0283786 | A1 | 12/2005 | Dettinger et al. |
| 2006/0288327 | A1 * | 12/2006 | Torgerson et al. ............. 717/105 |

OTHER PUBLICATIONS

"Configuring BEA e Link TXP for IMS", Mar. 11, 2001.

* cited by examiner

METHOD AND APPARATUS FOR OPTIMIZING PERFORMANCE AND NETWORK TRAFFIC IN DISTRIBUTED WORKFLOW PROCESSING

CROSS-REFERENCED TO RELATED APPLICATIONS

This application is a continuation of co-pending U.S. patent application Ser. No. 10/877,229, filed Jun. 25, 2004. The aforementioned related patent application is herein incorporated by reference in its entirety.

BACKGROUND OF THE INVENTION

1. Field of the Invention

The present invention generally relates to workflow processing and, more particularly to optimizing workflow execution by making intelligent decisions regarding service requests to perform workflow processes on one or more servers.

2. Description of the Related Art

Workflow processing technologies typically provide application integration capabilities, enabling a series of separate software components to be run in a defined sequence facilitating construction of larger solutions from individual software components. Workflow implementations are typically driven from a workflow definition, commonly captured as an eXtensible Markup Language (XML) document, that identifies the sequence of tasks to perform and data flows from one task to another. Thus, workflow engines provide the ability to string together functionality from different applications and servers into an overriding process.

This advancing technology allows application functionality to be customized into a flow that matches a company's business processes. Typically, by taking the output of one process and performing modifications to the structure of the output data, the input data for the next process is achieved. A series of iterations of this process provides the overall business process flow. In some cases, in order to take advantage of processing capabilities available on different servers, each of the processes of a workflow is performed as a service request issued by a workflow controller to a server which executes the process. As the servers are often available via the Internet or a company's Intranet, these service requests are often referred to as Web service requests. When a process has executed, the results are returned to the workflow flow controller which modifies the data as needed to the input data format needed for the next process.

A significant problem with workflow processing is the overhead of service requests. This problem may be illustrated by a simple exemplary workflow which contains three tasks: A, B, and C. Assuming there is some minor transformation of data that must happen between the tasks, which may be performed by functions AtoB and BtoC. It is further assumed that A, B, and C are services and that A and B in this workflow are performed on a first server, while C is performed on a second server. This exemplary workflow may thus be represented as the following:

doA—This service request goes to server1 for execution
    AtoB—results from A are returned to controller and transformed
    doB—This service request goes to server1 for execution
    BtoC—results returned to controller, transformed
    doC—This service request goes to server2 for execution Although both A and B are performed on server 1, results from A are transferred back to the workflow controller, formatted, and sent back to server 1. For some applications, the amount of data involved in each of these processes may be substantial (e.g., hundreds or thousands of database records), resulting in increased network traffic. Further, in some cases, the processes may be performed as part of a loop, requiring transfer of data for every iteration. If both A and B could be performed on server 1 without the service requests between them, however, the network bandwidth and overall execution time of the workflow may be reduced.

While one solution to this problem may be to generate a single service to perform all tasks on a common server (e.g., a service to perform tasks A, B and C all at once), this solution is suboptimal and may lead to many large specialized services (e.g., one for each workflow). For example, many different workflows may require only B and C or only B. Making extremely large services to perform all tasks is less desirable than being able to combine or integrate different smaller services (e.g., one to perform A, one to perform B, and one to perform C) into a higher level service.

Accordingly, there is a need to optimize workflow processing, for example, by making intelligent decisions regarding service requests to perform workflow processes on one or more servers in an effort to reduce the total network and processing overhead associated with the service requests.

SUMMARY OF THE INVENTION

The present invention generally provides methods and systems for optimizing the execution of workflows.

One embodiment provides a method of executing a workflow in a multi-server environment. The method generally includes obtaining, at a local server, a sequence of tasks to be performed as part of the workflow, generating, at the local server, a remote service to perform two or more of the tasks on a first remote server, sending the remote service to the first remote server, and executing the workflow, by the local server, with a call to the generated remote service to perform the two or more tasks locally on the first remote server.

Another embodiment provides a method of executing a workflow in a multi-server environment. The method generally includes obtaining, at a local server, a sequence of tasks to be performed as part of the workflow and executing the workflow, by the local server, with a call to a previously generated remote service to perform the two or more tasks locally on a first remote server.

Another embodiment provides a computer-readable medium containing a program for executing a workflow in a multi-server environment. When executed by a processor, the program performs operations comprising obtaining, at a local server, a sequence of tasks to be performed as part of the workflow and initiating execution of the workflow, by the local server, with a call to a remote service generated to perform the two or more tasks locally on a first remote server.

Another embodiment provides a system for executing a workflow in a multi-server computing environment. The system generally includes a sequence of tasks to be performed as part of the workflow, a services repository containing data identifying one or more services available on one or more remote servers in the environment for performing one or more of the workflow tasks, and a workflow controller. The workflow controller is generally configured to examine the services repository to identify multiple tasks of the workflow that may be performed by local execution of one or more of the available services on a first remote server, generate a remote service to perform the multiple tasks locally on the first remote server, send the generated remote service to the first remote server, and execute the workflow with a call to the generated remote service to cause the multiple tasks to be performed locally on the first remote server.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention provide methods and apparatus to optimize workflow execution by making intelligent decisions regarding service requests to perform workflow processes on one or more servers. For some embodiments, a workflow controller may analyze a workflow definition specifying a set of tasks to be performed in order to determine if multiple tasks may be performed on a common server. If so, the controller may generate a remote service to run the multiple tasks on the common server, without requiring intermediate transfer of data between a (local) server on which the controller is running and the common (remote) server. By thus consolidating remote services to perform multiple tasks of the workflow without local server interaction, network bandwidth and overall execution time of the workflow may be reduced.

As used herein, the term service (or web service) generally refers to a self-contained, modular application that can be located on a server (e.g., a remote server) and invoked by another server (e.g., a local server) over a network, such as a company intranet and/or the Internet. The terms local server and remote server are relative terms used to distinguish one server from another (network accessible) server and do not imply any particular geographic separation between such servers. As used herein, the term workflow generally refers to a combination of tasks that are to be performed, collectively, to achieve a desired result. As used herein, the term task (or workflow) metadata generally refers to descriptive information amount tasks to be performed as part of a workflow and may include, among other things, an identification of input required by and/or output generated by a task, as well as an identification of tasks that may be performed in parallel.

Figure 1:
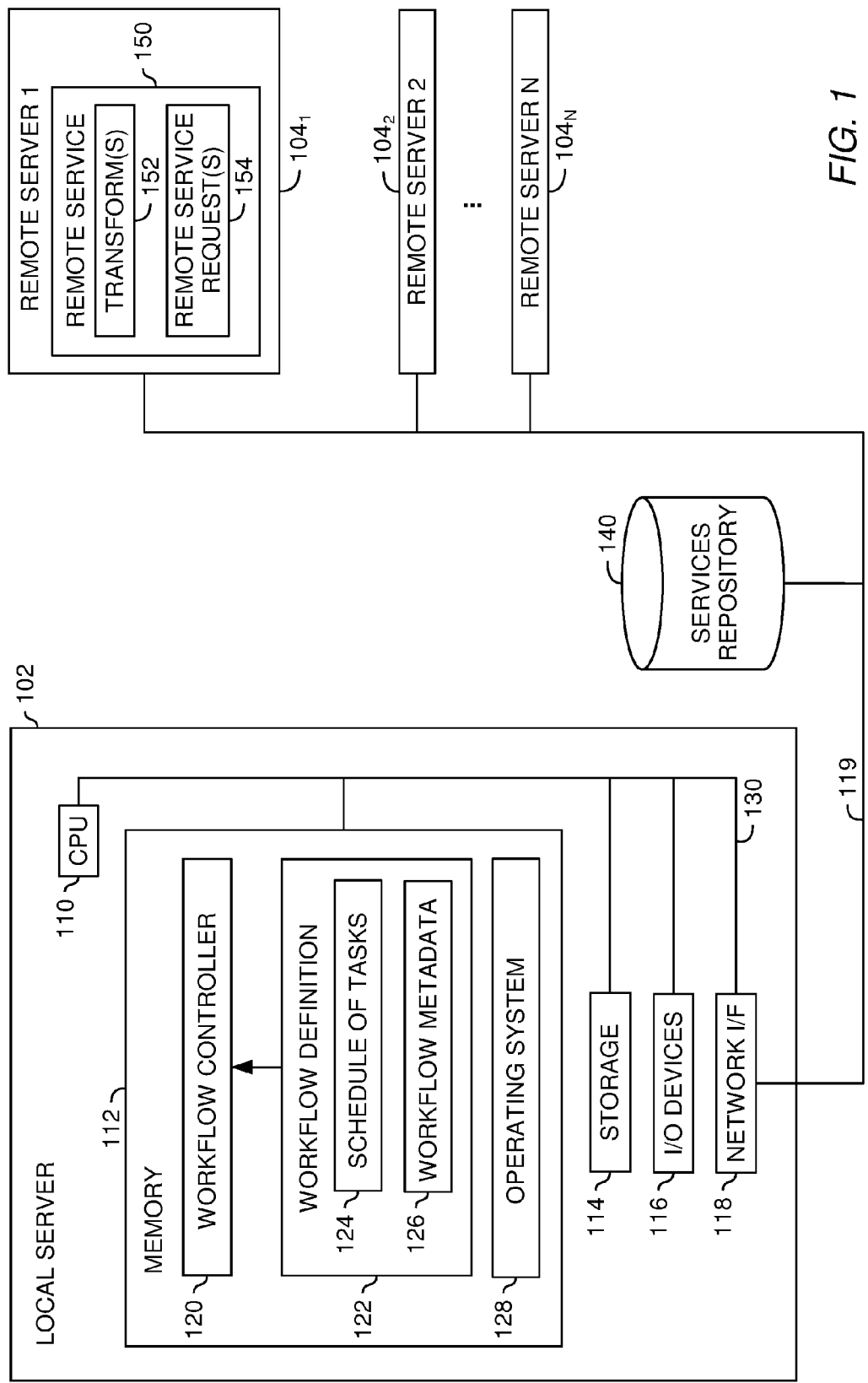
FIG. 1 illustrates a networked computing system in which embodiments of the present invention may be utilized.

Embodiments of the present invention may be implemented as a program product, for example, including a workflow controller 120, for use in executing a workflow in the network computing environment 100 shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In the following, reference is made to embodiments of the invention. It should be understood, however, that the invention is not limited to any specific embodiments described herein. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether a particular advantage is achieved by a given embodiment is not limiting of the invention. Thus, the following aspects, features, embodiments and advantages are merely illustrative and, unless explicitly present, are not considered elements or limitations of the appended claims.

An Exemplary Networked Computing Environment

FIG. 1 shows an networked computing environment 100, in which embodiments of the present invention may be utilized. As illustrated, the environment 100 may include a local server 102 connected to a plurality of remote servers 104 (illustratively, N remote servers $104_{1-N}$ are shown). Each server (102 or 104) may be any suitable type of computer system, including desktop computers (e.g., workstations), servers, handheld devices, and the like.

As shown in the local server 102, typical computing resources available at each server may include one or more Central Processing Units (CPUs) 110, memory 104, storage 114, and input/output (I/O) devices 116, which may be connected at the server via a bus 130. I/O devices 116 may include printers, scanners, media players, keyboards, mice, and the like. Storage 114 may include any suitable storage means, such as a Direct Access Storage Device (DASD). As illustrated, a network interface 118 may allow for access to the remote servers 104, via any suitable type network connection 119, which may include any combination of wired and/or wireless local area networks and wide area networks, including the Internet.

The CPUs may include any number of any type suitable CPUs capable of executing instructions for a task dispatched to that server, while the memory 104 may include any suitable type memory, such as random access memory (RAM). As illustrated, the local server 102 may include a workflow controller 120 configured to execute a workflow. The workflow may be defined by a workflow definition 122, which may include a sequence of tasks 124 and workflow metadata 126. The workflow metadata 126 may include information necessary to run all workflow tasks, such as an identification of inputs required to perform a task and/or an identification of outputs generated by a task.

Workflow Optimization

The workflow controller 120 may be configured to execute one or more tasks in a workflow by making remote service requests to have one or more tasks performed by one or more of the remote servers 104. Different services available via each of the remote servers 104 may be identified in a service repository 140. Accordingly, the workflow controller 120 may "discover" the services available via the remote servers 104 by examining a services repository 140. As will be described in greater detail below, for some embodiments, the workflow controller 120 may be configured to analyze a workflow to determine if multiple tasks thereof may be performed by local execution of services on a common remote server 104.

If multiple tasks of the workflow may be performed by local execution on a common remote server 104 network traffic and overall workflow execution time may be reduced, particularly for workflows with a large number of tasks and/or looped tasks which may otherwise result in a large volume of network traffic. Accordingly, in such cases, the workflow controller 120 may generate a remote service to perform the multiple tasks on the remote server 104. As an example, the workflow controller 120 may generate a remote service 150 to perform multiple tasks on a remote server $104_1$.

Thus, rather than build a relatively large (specialized) service to perform all workflow tasks locally, the remote service requests 154 may be used to optimize workflow execution while taking advantage of pre-existing services available on remote servers 104 to perform certain groups of tasks locally thereon. As will be described in greater detail below, the remote service 150 may include any suitable transforms 152 necessary to convert the data output from one task into data suitable for input into the next task and, for some embodiments, one or more remote service requests 154 to perform tasks on other remote servers $104_2$-$104_N$.

Figure 2:
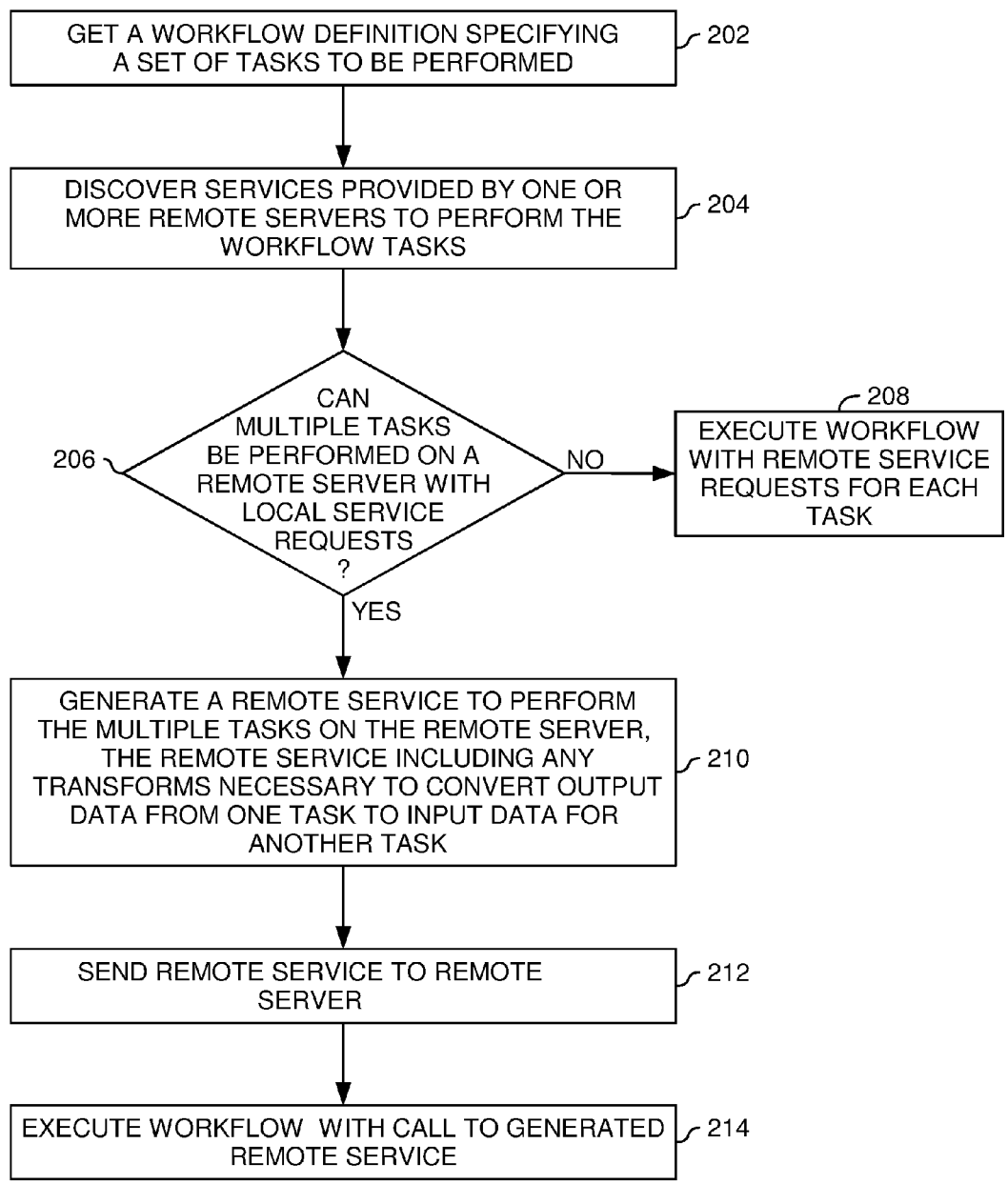
FIG. 2 is a flow diagram of exemplary operations for optimizing workflow processing in accordance with embodiments of the present invention.

FIG. 2 is a flow diagram of exemplary operations 200 that may be performed by the workflow controller 120 to optimize execution of a workflow. As such, the exemplary operations 200 may be described with simultaneous reference to FIGS. 1 and 2. At step 202, the workflow controller 120 obtains a workflow definition 122 specifying a set of tasks to be performed. At step 204, the workflow controller 120 discovers services provided by one or more remote servers 104 to perform one or more of the workflow tasks (e.g., by examining the services repository 140).

As previously described, when executing a workflow conventionally, it may not really matter which server provides which service to perform the tasks, as each is typically called individually. However, when considering optimization of a process flow involving multiple service requests, the particular host chosen for a service can become significant. Therefore, at step 206, the workflow controller 120 analyzes the workflow definition 122 to determine if multiple (e.g., sequential) tasks of the workflow can be performed on a remote server 104 with local service requests. In other words, the workflow controller 120 attempts to identify multiple tasks that may be executed locally on a remote server 104. If not, the workflow is executed with remote service requests for each task (the workflow controller 120 cannot perform locally), at step 208.

On the other hand, if multiple tasks can be executed locally on a remote server (e.g., with local service requests), a remote service 150 to perform the multiple tasks on the remote server 104 is generated, at step 210, including any transforms 152 necessary to convert output data from one task to input data required for another (subsequent) task. At step 212, the remote service is sent to the remote server (e.g., using any suitable mechanism, such as a SOAP message). At step 214, the workflow controller 120 executes the workflow with a call (or calls, depending on the workflow) to the generated remote service 150.

In some cases, it may be desirable that the workflow controller 120 have the ability to recognize changes to a workflow in order to avoid invalidating optimization assumptions. The workflow controller 120 may check for changes in a variety of ways, such as with a mechanism that parses a workflow at execution time with a mechanism that generates a workflow script (e.g., such a mechanism may signal the workflow controller 120 to indicate a change to a workflow). Changes to a workflow imply that some optimization assumptions may no longer be valid and a recheck of the validity of the assumptions made initially is required. In response to detecting such changes, the workflow controller 120 may modify generated remote services accordingly. This notion is analogous to the concept of recompiling software when changes to source code are made, which require re-analysis and re-application of appropriate optimization techniques.

There may also be a security concern to address in having the workflow controller 120 provide a piece of code which will be come a part of a remote server service request. This concern may be readily addressed via a number of existing security techniques, such as sandboxing techniques which limit the scope of what functionality the workflow controller 120 can provide as intermediate transformation steps ("glue") between sequential tasks.

Exemplary Workflow Execution

Figure 3A:
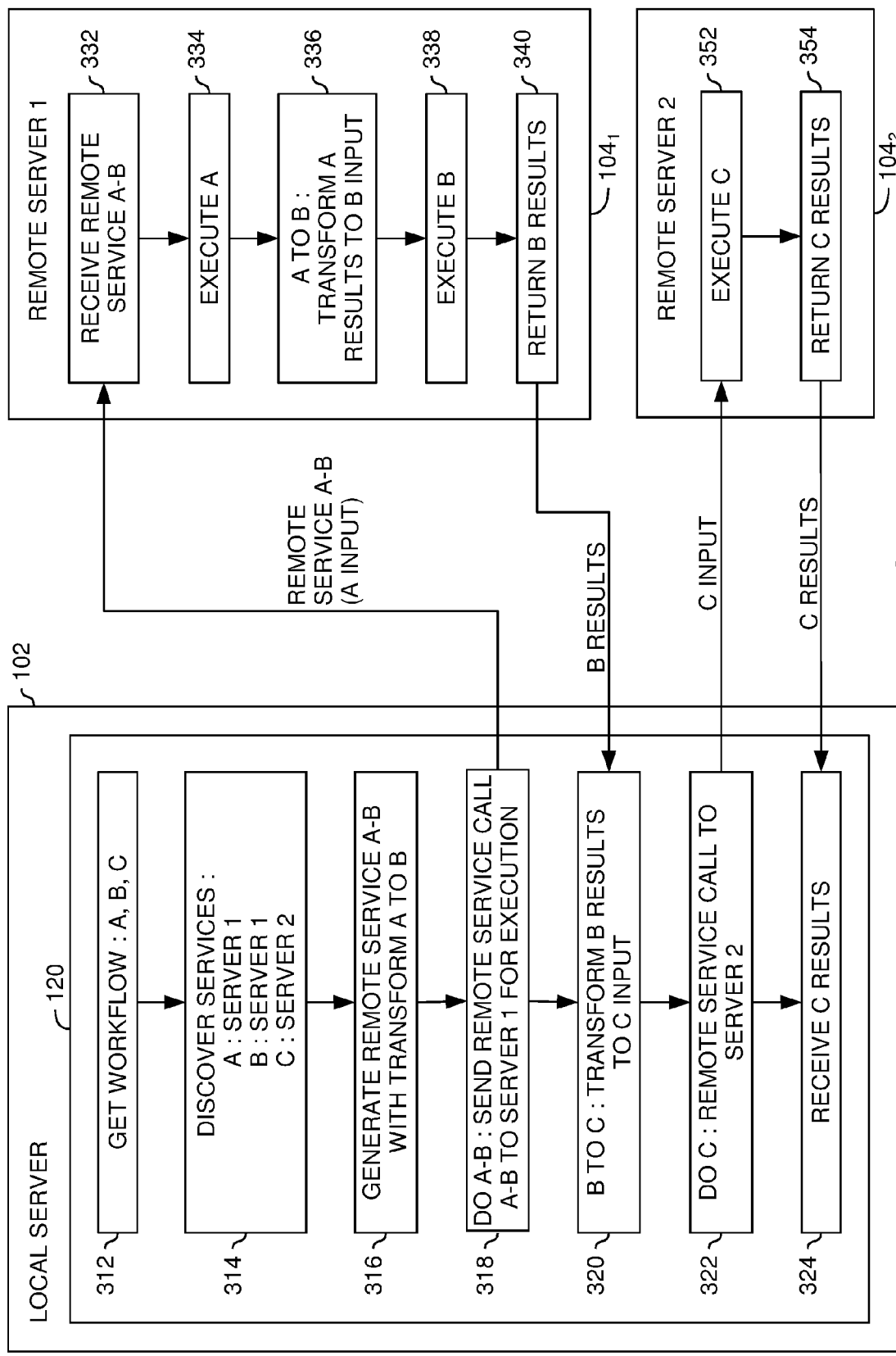
FIGS. 3A and 3B are flow diagrams of exemplary operations for workflow processing performed on remote servers in accordance with embodiments of the present invention.
Figure 3B:
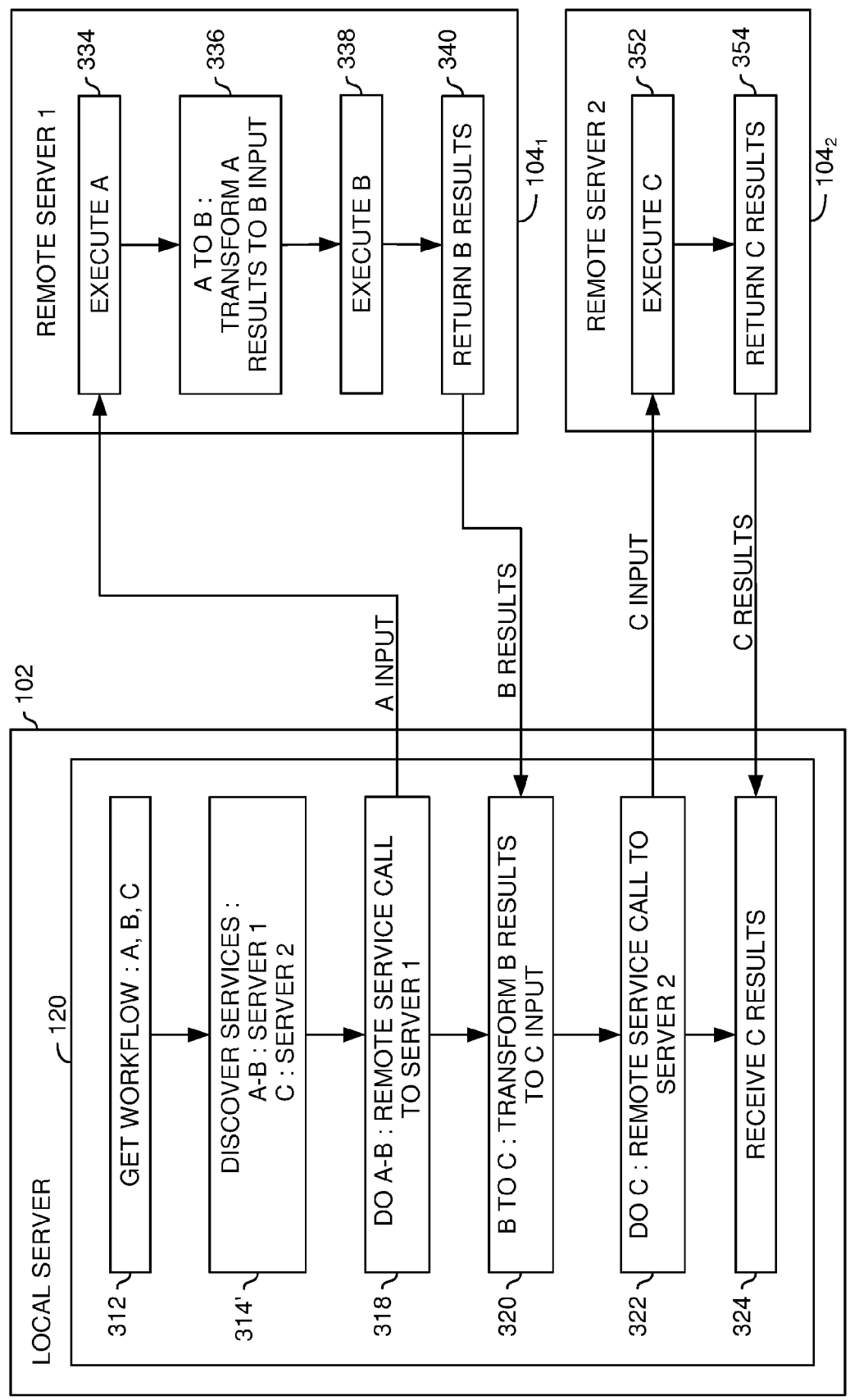

FIGS. 3A and 3B are flow diagrams of exemplary operations for workflow processing performed on remote servers in accordance with embodiments of the present invention. The illustrated operations are for executing a relatively simple workflow described above involving three tasks: A, B, and C. Rather than issue separate remote service calls for each task, the workflow controller 120 makes a remote service call to perform at least two of the tasks (A and B in this example) on a remote server, which may reduce the overall number of remote service calls and associated network traffic.

Referring first to FIG. 3A, at step 312, the workflow controller 120 obtains a definition for the workflow to be run, having three tasks: A, B, and C. At step 314, the workflow controller 120 discovers tasks A and B may be performed by services available on a first remote server $104_1$ (server 1), while task C may be performed by services available on a second remote server $104_2$ (server 2). Accordingly, at step 316, the workflow controller 120 generates a remote service (A-B) to perform tasks A and B on remote server 1, with the remote service (A-B) including a transform (AtoB) to convert the output data from task A to a format suitable for use as input for task B. At step 318, the workflow controller sends the remote service (A-B) to server 1 for execution.

Remote server 1 receives the remote service (A-B), at step 332, and executes task A, at step 334. Rather than return the results from executing task A to the workflow controller to convert the results to input suitable for B, remote server 1 performs the transform AtoB locally, at step 336, as part of the generated remote service received from the workflow controller. At step 338, remote server 1 executes task B and returns the results from executing task B (the B results) to the workflow controller 120, at step 340.

At step 320, the workflow controller 120 (receives and) transforms the B results to input suitable for task C (C input). At step 322, the workflow controller 120 makes a remote service call (doC) to perform task C on remote server 2. At step 352, the workflow controller executes task C and returns C results to the workflow controller, at step 354. At step 324, the workflow controller 120 receives the C results, thus completing the workflow. While not shown, in some cases, the workflow may involve a loop where one or more tasks are repeated, for example, until a predetermined condition or number of executions has been reached. In such cases, the workflow controller may generate a remote service call with sufficient logic to perform the looped operations locally.

As illustrated in FIG. 3B, for subsequent executions of the workflow (A, B, and C), the workflow controller 120 may skip generating the remote service A-B. For example, having already generated and deployed the remote service A-B (or if another workflow controller had generated and deployed the remote service A-B), the workflow controller 120 may discover the remote service A-B, at step 314', and proceed to call the remote service A-B, at step 318. Thus, once deployed, any overhead associated with generating remote services by the workflow controller 120 may be reduced for subsequent executions thereof.

As previously described, in some cases, the workflow controller 120 may generate and call a remote service call with service calls between one or more remote servers. The utilization of service calls between remote servers may be illustrated by a simple exemplary workflow which contains the following tasks: A1-A3, B, A4-A6. It is assumed that tasks A1-A6 can be performed on a first remote server (server 1), while task B can be performed on a second remote server (server 2). To facilitate discussion, any necessary transforms to convert the results of one task to another are not discussed. Thus, this exemplary workflow may thus be represented as the following:

doA1—This service request goes to server1 for execution
doA2—This service request goes to server1 for execution
doA3—This service request goes to server1 for execution
doB—This service request goes to server2 for execution
doA4—This service request goes to server1 for execution
doA5—This service request goes to server1 for execution
doA6—This service request goes to server1 for execution As described above, the workflow controller 120 could generate separate remote service calls to perform tasks A1-A3 and tasks A4-A6 on server 1, with a remote service call to server 2 to perform task B. However, this approach would result in at least three network transactions between the workflow controller and remote servers (doA1-A3, doB, and doA4-A6).

Another approach that may reduce the overall number of network transactions would be to build additional remote functionality into a remote service call sent to server 1, with one of the middle tasks being to perform a service request to the remote server 2 to perform task B. In other words, rather than the workflow controller 120 calling a remote service to perform tasks A1-A3 together on remote server 1, call a remote service to perform task B on remote server 2, and calling another remote service to perform tasks A4-A6 on remote server 1, the workflow controller 120 may generate a single remote service call with tasks A1-A6 together, with a service call from remote server 1 to remote server 2 to perform task B.

Figure 4:
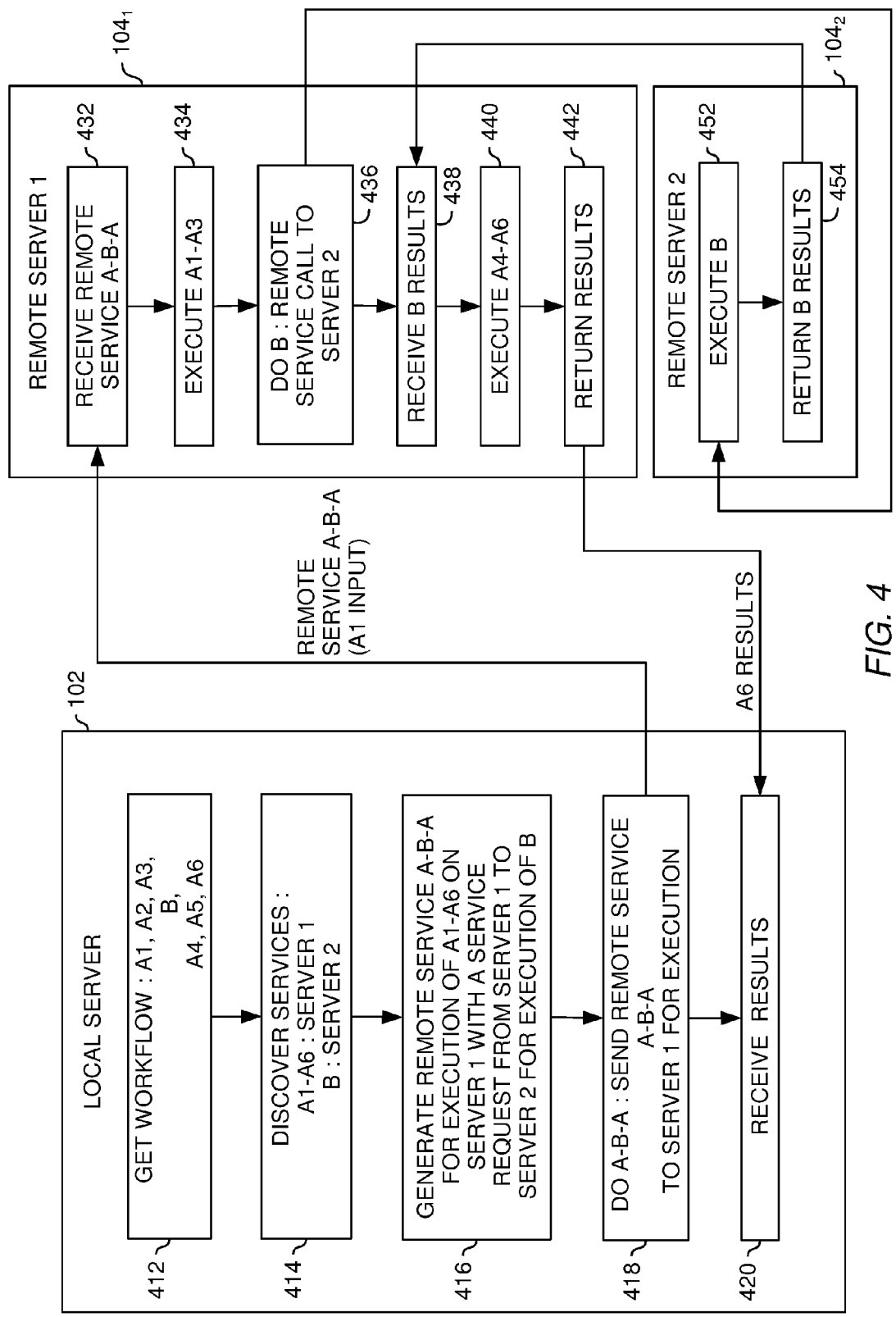
FIG. 4 is a flow diagram of exemplary operations for workflow processing with service calls between remote servers in accordance with embodiments of the present invention.

FIG. 4 is a flow diagram of exemplary operations for executing the exemplary workflow described above, with a service call between remote servers in accordance with embodiments of the present invention. At step 412, the workflow controller 120 receives a workflow definition for the workflow with the following tasks: A1, A2, A3, B, A4, A5, and A6. At step 414, the workflow controller discovers that services to perform tasks A1-A6 are available on remote server 1, while a service to perform task B is available on remote server 2. At step 416, the workflow controller generates a remote service (ABA) for execution of tasks A1-A6 and task B from remote server 1, with a remote service call between remote server 1 and remote server 2.

At step 418, the workflow controller sends the remote service ABA to remote server 1 for execution. At step 432, remote server 1 receives the remote service ABA. At step 434, the remote server 1 executes tasks A1-A3 locally. At step 436, the remote server 1 makes a remote service call to perform task B on remote server 2. At step 452, the remote server 2 executes task B locally and returns the B results to remote server 1, at step 454. Remote server 1 receives the B results, at step 438, executes tasks A4-A6 locally, at step 440, and returns results to the workflow controller 120, at step 442. At step 420, the workflow controller 120 receives the results, thus completing the workflow.

CONCLUSION

A workflow controller may be configured to optimize workflow execution by analyzing a workflow definition and generating a remote service, in an effort to perform a set of the workflow tasks locally on a remote server. As a result, the overall number of remote service calls between the workflow controller and remote servers, as well as the associated network traffic, may be reduced.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable storage medium containing a program for executing a workflow in a multi-server environment which, when executed by a processor, performs operations comprising:

obtaining, at a local server, a sequence of tasks to be performed as part of the workflow;

analyzing, at the local server, the sequence of tasks to determine if multiple tasks may be performed locally on a first remote server;

upon determining that multiple tasks may be performed locally on the first remote server, generating, at the local server, a first remote service to perform two or more of the tasks on the first remote server, wherein:

the remote service includes a call from the first remote server to a second remote server to perform at least one of the sequence of tasks; and data output from at least one of the tasks performed by the second remote server in response to the call is returned to the first remote server;

sending the remote service to the first remote server; and executing the workflow, by the local server, with a call to the generated remote service to perform the two or more tasks locally on the first remote server.

2. The computer-readable storage medium of claim 1, wherein the operations further comprise: discovering services available on remote servers in the multi-server environment to perform tasks of the workflow.

3. The computer-readable storage medium of claim 1, wherein generating, at the local server, the remote service comprises generating the remote service with a transform to convert data output from one of the two or more tasks to input usable by a subsequent one of the two or more tasks.

4. The computer-readable storage medium of claim 1, wherein executing the workflow comprises:
- calling one or more remote services, including the generated remote service; and
- performing a transform, at the local server, to convert data output from one of the sequence of tasks to input usable by a subsequent one of the sequence of tasks.

5. The computer-readable storage medium of claim 1, wherein the operations further comprise:
- detecting a change to the sequence of tasks to be performed as part of the workflow; and
- in response to detecting the change, modifying the generated remote service.

6. A non-transitory computer-readable storage medium containing a program for executing a workflow in a multi-server environment which,
- when executed by a processor, performs operations, comprising:
  - obtaining, at a local server, a sequence of tasks to be performed as part of the workflow;
  - analyzing, at the local server, the workflow to determine if multiple tasks may be performed locally on a first remote server; and
  - upon determining that multiple tasks may be performed locally on the first remote server, executing the workflow, by the local server, with a call to a previously generated remote service to perform the two or more tasks locally on a first remote server.

7. The computer-readable storage medium of claim 6, wherein the operations further comprise: discovering services available on remote servers in the multi-server environment to perform tasks of the workflow, including the previously generated remote service.

8. The computer-readable storage medium of claim 6, wherein the previously generated remote service comprises a transform to convert data output from one of the two or more tasks to input usable by a subsequent one of the two or more tasks.

9. The computer-readable storage medium of claim 6, wherein the previously generated remote service comprises a call from the first remote server to a second remote server to perform at least one of the sequence of tasks.

10. The computer-readable storage medium of claim 6, wherein executing the workflow comprises:
- calling one or more remote services, including the generated remote service; and
- performing a transform, at the local server, to convert data output from one of the sequence of tasks to input usable by a subsequent one of the sequence of tasks.

11. A system for executing a workflow in a multi-server computing environment, comprising:
- a sequence of tasks to be performed as part of the workflow;
- a services repository containing data identifying one or more services available on one or more remote servers in the environment for performing one or more of the workflow tasks; and
- the workflow controller, wherein the workflow controller is configured to:
- examine the services repository to analyze the sequence of tasks to determine if multiple tasks may be performed locally on a first remote server,
- upon determining that multiple tasks may be performed locally on the first remote server, generate a first remote service to perform two or more of the tasks on the first remote server, wherein:
  - the remote service includes a call from the first remote server to a second remote server to perform at least one of the sequence of tasks; and
  - data output from at least one of the tasks performed by the second remote server in response to the call is returned to the first remote server, and
- send the remote service to the first remote server; and
- execute the workflow by invoking a call to the generated remote service to perform the two or more tasks locally on the first remote server.

12. The system of claim 11, wherein the workflow controller is further configured to discover services available on remote servers in the multi-server environment to perform tasks of the workflow.

13. The system of claim 11, wherein generating, by the workflow controller, the remote service comprises generating the remote service with a transform to convert data output from one of the two or more tasks to input usable by a subsequent one of the two or more tasks.

14. The system of claim 11, wherein executing the workflow comprises:
- calling one or more remote services, including the generated remote service; and
- performing a transform, at the workflow controller, to convert data output from one of the sequence of tasks to input usable by a subsequent one of the sequence of tasks.

* * * * *